United States Patent
Williams et al.

(10) Patent No.: US 12,441,886 B2
(45) Date of Patent: Oct. 14, 2025

(54) SILOXANE TREATMENT VESSEL REGENERATION

(71) Applicant: GRANITEFUEL ENGINEERING INC., Concord (CA)

(72) Inventors: Shazam S. Williams, Toronto (CA); Linjie Hu, Vaughan (CA); Glen Thomas Prisciak, Georgetown (CA)

(73) Assignee: GRANITEFUEL ENGINEERING INC., Concord (CA)

( * ) Notice: Subject to any disclaimer, the term of this patent is extended or adjusted under 35 U.S.C. 154(b) by 571 days.

(21) Appl. No.: 17/908,975

(22) PCT Filed: Mar. 2, 2021

(86) PCT No.: PCT/CA2021/050267
§ 371 (c)(1),
(2) Date: Sep. 2, 2022

(87) PCT Pub. No.: WO2021/174349
PCT Pub. Date: Sep. 10, 2021

(65) Prior Publication Data
US 2023/0094126 A1 Mar. 30, 2023

Related U.S. Application Data

(60) Provisional application No. 62/984,009, filed on Mar. 2, 2020.

(51) Int. Cl.
*B01J 8/00* (2006.01)
*C08L 83/04* (2006.01)

(52) U.S. Cl.
CPC ............ *C08L 83/04* (2013.01); *B01J 8/0085* (2013.01)

(58) Field of Classification Search
CPC .. B01J 8/00; B01J 20/20; B01J 8/0085; C08L 83/04; C07F 7/087; C07F 7/0872
See application file for complete search history.

(56) References Cited

U.S. PATENT DOCUMENTS 6,712,885 B1    3/2004  Basseen et al.
7,959,710 B2 *  6/2011  Olsen ............... B01D 5/0045
                                                95/271

(Continued)

FOREIGN PATENT DOCUMENTS

EP      1997549 B1      9/2010
JP      2014006221 A    1/2014

(Continued)

OTHER PUBLICATIONS

Extended European Search Report dated Feb. 28, 2024 in respect of European Application No. 21763769.3.

(Continued)

*Primary Examiner* — Sharon Pregler
(74) *Attorney, Agent, or Firm* — Smart & Biggar LP

(57) ABSTRACT

A system for and method of regenerating a siloxane treatment vessel. At least one heat exchanger receives a flow of fluid from the siloxane treatment vessel, and discharges a cooled flow. A knockout tank receives the cooled flow, separates a condensed portion for disposal, and discharges the remainder. A heater raises a temperature of the remainder flow of fluid, and delivers a heated flow to the siloxane treatment vessel.

15 Claims, 4 Drawing Sheets

(56) References Cited

U.S. PATENT DOCUMENTS

| | | | |
|---|---|---|---|
| 9,480,944 B2 * | 11/2016 | Ballantyne | B01D 53/04 |
| 9,890,674 B2 | 2/2018 | Williams et al. | |
| 10,843,118 B2 | 11/2020 | Muter et al. | |
| 2004/0045440 A1 | 3/2004 | Baseen et al. | |
| 2006/0225571 A1 | 10/2006 | Higgins | |
| 2007/0086931 A1 | 4/2007 | Raoux et al. | |
| 2013/0034465 A1 | 2/2013 | Kanno et al. | |
| 2013/0209338 A1 | 8/2013 | Prasad et al. | |
| 2013/0340616 A1 | 12/2013 | Iyer | |
| 2015/0209717 A1 | 7/2015 | Ballantyne et al. | |
| 2016/0206990 A1 | 7/2016 | Bossan | |
| 2018/0163587 A1 | 6/2018 | Williams et al. | |

FOREIGN PATENT DOCUMENTS

| | | | |
|---|---|---|---|
| JP | 201483511 A | 5/2014 | |
| JP | 2014083511 A | 5/2014 | |
| KR | 20170036561 A | 4/2017 | |
| WO | 2018189027 A1 | 10/2018 | |
| WO | 2021151206 A1 | 8/2021 | |
| WO | 2022126278 A1 | 6/2022 | |

OTHER PUBLICATIONS

Montanari et al., Purification of landfill biogases from siloxanes by adsorption: A study of silica and 13X zeolite adsorbents on hexamethylcyclotrisiloxane separation, Chemical Engineering Journal 165 (2010) 859-863.

Urban et al., "Catalytically upgraded landfill gas as a cost-effective alternative for fuel cells", Journal of Power Sources 193 (2009) pp. 359-366.

International Search Report and Written Opinion dated Apr. 22, 2021 in respect of PCT/CA2021/050267.

Sonoc et al., "Kinetic study of the thermal decomposition of octamethylcyclotetrasiloxane on activated gamma alumina", Journal of Environmental Chemical Engineering 5 (2017) pp. 4858-4865.

Finocchio et al., "Decomposition of hexamethylcyclotrisiloxane over solid oxides", Chemosphere 72 (2008) pp. 1659-1663.

Davidson et al., "Kinetics of the Thermolysis of Octamethylcyclotetrasiloxane in the Gas Phase", Feb. 26, 2075, pp. 2260-2265.

Preißinger et al., Thermal Stability of Hexamethyldisiloxane (MM) for High-Temperature Organic Rankine Cycle (ORC), Energies 2016, 9, 183; doi:10.3390.

* cited by examiner

SILOXANE TREATMENT VESSEL REGENERATION

CROSS REFERENCE TO RELATED APPLICATIONS

This is a national stage application of International Application No. PCT/CA2021/050267 filed on Mar. 2, 2021, which claims priority to U.S. Provisional Application No. 62/984,009 filed on Mar. 2, 2020, the entire contents of which are hereby incorporated herein by reference.

FIELD

The present disclosure relates generally to fluid treatment to remove contaminants.

BACKGROUND

The following paragraphs are not an admission that anything discussed in them is prior art or part of the knowledge of persons skilled in the art.

U.S. Pat. No. 6,712,885 B1 discloses a method and apparatus for continuously removing siloxanes and $H_2O$ from a waste gas stream containing $H_2O$ and siloxanes includes cooling the waste gas stream in a primary heat exchanger to a temperature of greater than 2° F. to condense a portion of the $H_2O$ from the waste gas stream, chilling the waste gas stream in a first gas-refrigerant heat exchanger to a temperature of about −20° F. to condense the siloxanes and freeze the $H_2O$ and then directing the cooled waste gas stream from the primary heat exchanger to a second gas-refrigerant heat exchanger while the first gas-refrigerant heat exchanger is defrosted to remove frozen $H_2O$ and siloxanes.

U.S. Pat. No. 9,890,674 B2 discloses a method of removing impurities from a gas including the steps of removing impurities from biogas comprising at least one adsorbents via a process vessel or reactor, directing the purified gas to a device to generate power and/or heat, regenerating the saturated adsorption media with the waste heat recovered from the engine exhaust and directing the regeneration gas (hot air or engine exhaust) to flare, engine exhaust stack, or atmosphere.

U.S. application Ser. No. 16/174,814 discloses a filtration apparatus for filtering a fluid stream including a vessel housing. At least one cartridge assembly is arranged within the vessel housing. The cartridge assembly includes filtration material arranged between at least one inlet and at least one outlet. The filtration material treats the fluid stream to form a filtered fluid stream. In use, the fluid stream is received at a feed port of the vessel housing, flows through the filtration material in the cartridge assembly between the inlet and the outlet, and the filtered fluid stream is discharged from a discharge port of the vessel housing. The filtration apparatus can be used to remove siloxanes from the fluid stream.

INTRODUCTION

The following is intended to introduce the reader to the detailed description that follows and not to define or limit the claimed subject matter.

In an aspect, the present disclosure relates to a system for regenerating a siloxane treatment vessel. The system can include: at least one heat exchanger configured to receive a flow of fluid from the siloxane treatment vessel, and discharge a cooled flow; a knockout tank configured to receive the cooled flow, separate a condensed portion for disposal, and discharge the remainder; and a heater configured to raise a temperature of the remainder flow of fluid, and deliver a heated flow to the siloxane treatment vessel.

The at least one heat exchanger can include first and second heat exchangers connected in series. The system can include a chiller device coupled to the second heat exchanger and configured to circulate coolant therebetween. The at least one heat exchanger can be configured to lower a temperature of the flow of fluid to approximately −20° C. or below. The heater can be configured to raise a temperature of the remainder flow of fluid to a range of between 5° and 250° C., or a range of between 9° and 150° C., or approximately 100° C.

The system can include a blower configured to draw the remainder flow of fluid from the knockout tank. The system can include an activated carbon filtration device configured to treat the remainder flow of fluid. The system can include: a valve arranged between the activated carbon filtration device and the blower; an exit for removal of contaminated gas intermediate of the activated carbon filtration device and the valve; and a supply of clean purge gas intermediate of the valve and the heater. The system can include a bypass conduit configured to divert a portion of the flow of fluid from the siloxane treatment vessel to the blower to bypass the at least one heat exchanger. The system can further include the siloxane treatment vessel.

In an aspect, the present disclosure relates to a method of regenerating a siloxane treatment vessel. The method can include: receiving a flow of fluid from the siloxane treatment vessel; cooling the flow of fluid; separating a condensed portion of the flow of fluid; disposing the condensed portion; heating the remainder flow of fluid; and delivering the heated flow to the siloxane treatment vessel.

The step of cooling can include passing the flow of fluid through at least one heat exchanger. The step of cooling can include circulating coolant between a chiller device and the at least one heat exchanger. The step of cooling can include lowering a temperature of the flow of fluid to approximately −20° C. or below. The step of separating can include passing the cooled flow of fluid through a knockout tank. The step of heating can include raising a temperature of the remainder flow of fluid to a range of between 5° and 250° C., or a range of between 9° and 150° C., or approximately 100° C.

The method can include, after the step of separating, passing the remainder flow of fluid through an activated carbon filtration device. The method can include, in a purge mode: removing contaminated gas; and introducing clean purge gas to the siloxane treatment vessel. The method can include bypassing a portion of the flow of fluid from the siloxane treatment vessel from the steps of cooling, separating and disposing.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The present disclosure relates generally to the removal of siloxanes and/or other volatile organic compounds from a siloxane treatment vessel by gas cooling and heating, and while reducing or avoiding the emission of waste gases to the environment.

Figure 1:
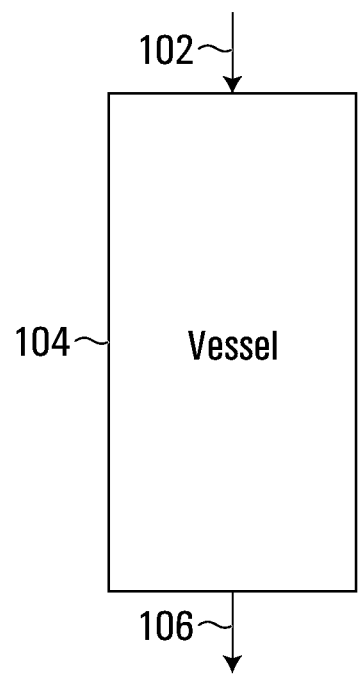
FIG. 1 is a schematic diagram of a siloxane treatment vessel.

Referring to FIG. 1, a flow 102 of fluid to be treated is shown received by a siloxane treatment vessel 104. The vessel 104 can contain adsorbent and/or filtration media for capturing siloxanes and other volatile organic compounds. The vessel 104 can remove siloxanes from the flow 102, and discharge a treated flow 106.

In some examples, the flow 102 can consist of preconditioned biogas after removal of hydrogen sulfide, oxygen and/or liquid water, and with a temperature of less than 35° C. In some examples, the flow 106 can be used as a process gas for combustion, as a renewable natural gas (RNG), to operate fuel cells, etc. In some examples, the vessel can take the form of an apparatus disclosed in U.S. application Ser. No. 16/174,814, the entire contents of which are hereby incorporated herein by reference.

Figure 2:
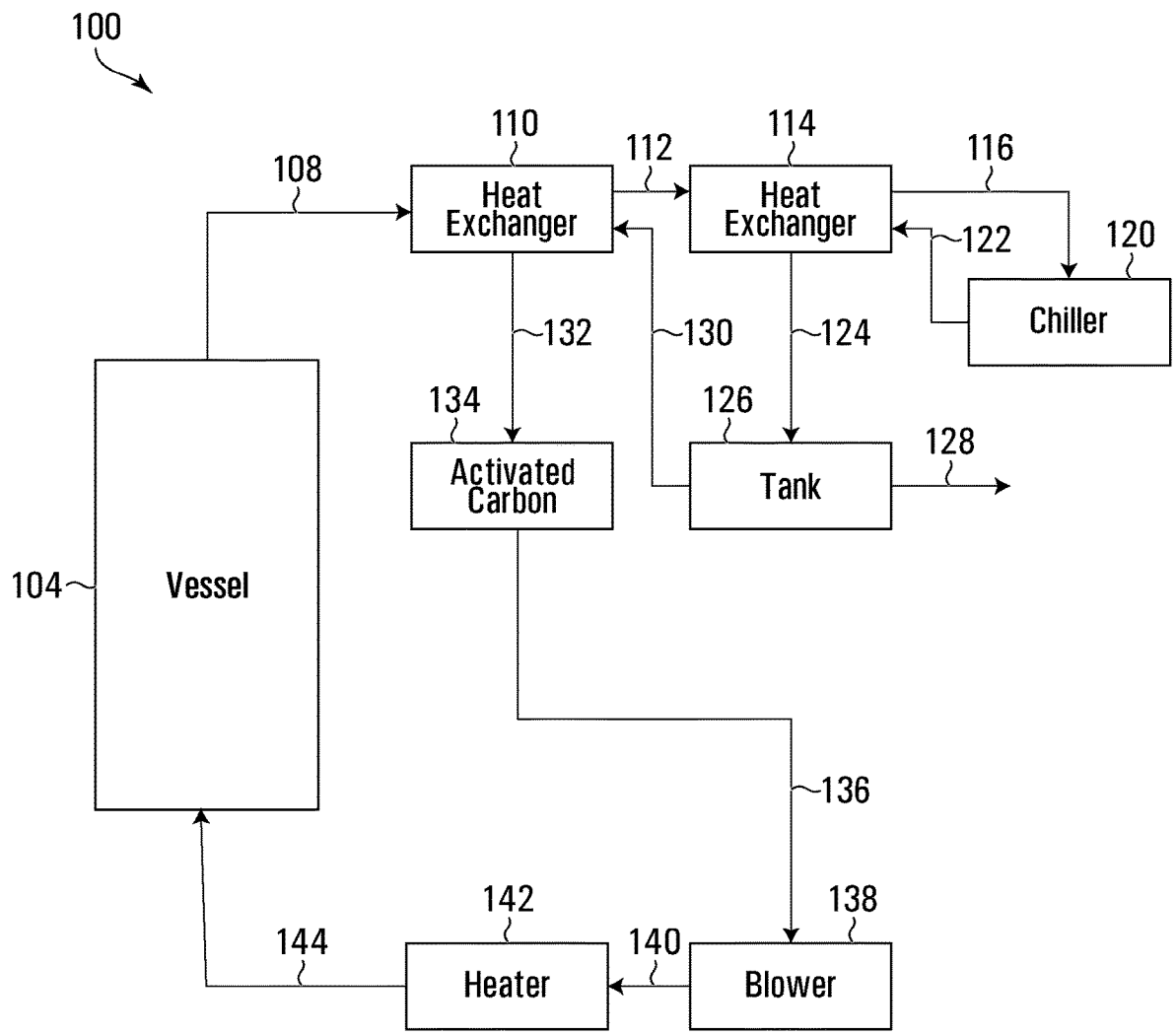
FIG. 2 is a schematic diagram of a first exemplary system.

Referring to FIG. 2, a system for regenerating a siloxane treatment vessel is indicated generally at reference numeral 100. The system 100 includes the vessel 104, and can be operated in accordance with a regeneration mode. In use, siloxanes and/or other organic compounds can be removed from the vessel 104 by gas cooling and heating, and without emitting waste gases to the environment.

In the example illustrated, an initial flow 108 of fluid is discharged at the vessel 104 and is received at a first heat exchanger 110. The flow 108 can consist of biogas including desorbed siloxanes from media within the vessel 104. A first cooled flow 112 of fluid is discharged at the heat exchanger 110 and is received at a second heat exchanger 114. A second cooled flow 124 of fluid is discharged at the heat exchanger 114. The heat exchangers 110, 114 can be connected in series and can operate to progressively reduce the temperature of the fluid.

In some examples, as illustrated, a chiller device 120 can be coupled to the heat exchanger 114, and coolant 116, 122 can be circulated therebetween. In some examples, the chiller device 120 can circulate glycol or another suitable coolant to maintain the heat exchanger 114 at a desired temperature.

In the example illustrated, a knockout tank 126 receives the flow 124 of fluid from the heat exchanger 114, and can separate a portion as condensed siloxanes, organic compounds and water 128. The remaining components can then be discharged from the tank 126 as a remainder flow 130. The flow 130 can consist of methane, low molecular weight siloxanes, volatile organic compounds and other chemical components. The flow 130 is shown directed back to the heat exchanger 110 for energy recovery.

In the example illustrated, a flow 132 of fluid is discharged at the heat exchanger 110 and is received at an activated carbon filtration device 134. The system 100 as shown further includes a blower 138 that draws a treated flow 136 from the filtration device 134. The blower 138 can be operated to control a circulation rate within the system 100, which can vary. The blower 138 delivers a flow 140 to a heater 142. The heater 142 can raise the temperature of the fluid, and a heated flow 144 is then delivered back to the vessel 104. In some examples, the heater 142 can be configured to raise a temperature of the fluid to a range of between 5° and 250° C., or a range of between 9° and 150° C. In some examples, the heater 142 can be configured to raise a temperature of the fluid to approximately 100° C.

In use, the system 100 can be used to thermally regenerate the vessel 104. In the regeneration mode, hot, siloxane-laden fluid exiting the vessel 104 as the flow 108 can be cooled by the at least one heat exchanger 110, 114 to remove water, siloxanes and other components. The condensed liquids are collected as the flow 128 and the fluid is recirculated. In the regeneration mode, the temperature of the heater 142 can be raised slowly to allow the vessel 104 to warm gradually. During this heating, fluid molecules can be desorbed to their vapor pressure at that temperature and then condensed over the heat exchangers 110, 114. It is possible that some liquids can solidify on the second heat exchanger 114. The heat exchanger 114 can be sized to accommodate solid formation on heat exchanger surfaces without plugging or otherwise mechanically blocking its operation.

In some examples, the heat exchanger 114 can be cooled so that the exiting flow 124 can be cooled to approximately −20° C. or below. In some examples, fluid can be recirculated within the system 100 until the heated flow 144 at the outlet of vessel 104 reaches approximately 100° C. and vapor pressure in the system 100 reaches steady state. At any time, if the tank 126 is full (e.g. a high level switch is activated), the tank 126 can be emptied and its contents discharged to a landfill or a storage tank (not shown). In some examples, the system 100 can include the filtration device 134 to prevent non-condensable siloxanes from reaching hot surfaces downstream where they can decompose and can deposit $SiO_2$ on the blower 138 and/or the heater 142.

Figure 3:
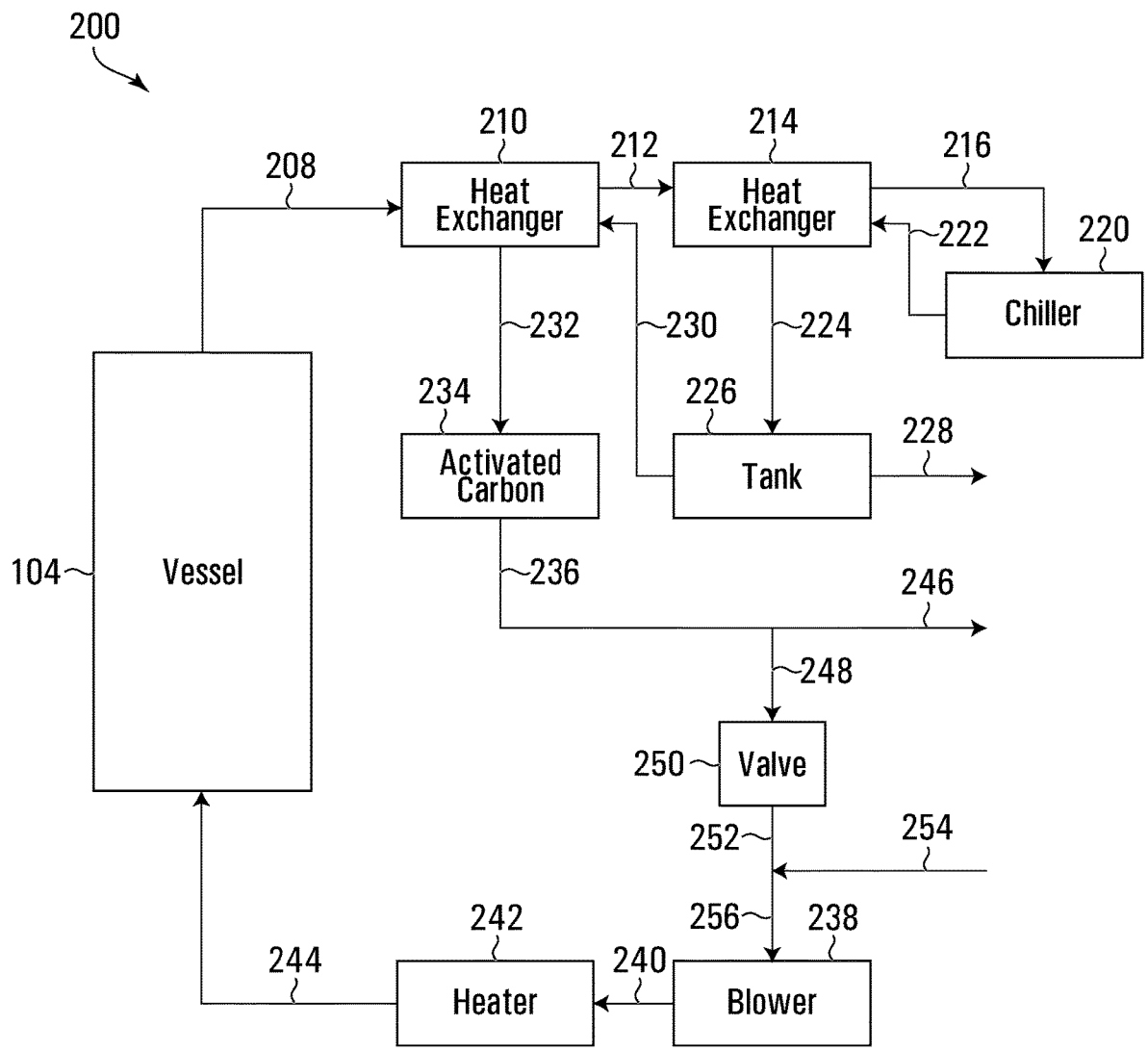
FIG. 3 is a schematic diagram of a second exemplary system.

Referring to FIG. 3, a system for regenerating a siloxane treatment vessel is indicated generally at reference numeral 200. The system 200 includes the vessel 104, and can be operated in accordance with a regeneration mode. In use, siloxanes and/or other organic compounds can be removed from the vessel 104 by gas cooling and heating, and without emitting waste gases to the environment.

In the example illustrated, an initial flow 208 of fluid is discharged at the vessel 104 and is received at a first heat exchanger 210. The flow 208 can consist of biogas including desorbed siloxanes from media within the vessel 104. A first cooled flow 212 of fluid is discharged at the heat exchanger 110 and is received at a second heat exchanger 214. A second cooled flow 224 of fluid is discharged at the heat exchanger 214. The heat exchangers 210, 214 can be connected in series and can operate to progressively reduce the temperature of the fluid.

In some examples, as illustrated, a chiller device 220 can be coupled to the heat exchanger 214, and coolant 216, 222 can be circulated therebetween. In some examples, the chiller device 220 can circulate glycol or another suitable coolant to maintain the heat exchanger 214 at a desired temperature.

In the example illustrated, a knockout tank 226 receives the flow 224 of fluid from the heat exchanger 214, and can separate a portion as condensed siloxanes, organic compounds and water 228. The remaining components can then be discharged from the tank 226 as a remainder flow 230. The flow 230 can consist of methane, low molecular weight siloxanes, volatile organic compounds and other chemical components. The flow 230 is shown directed back to the heat exchanger 210 for energy recovery.

In the example illustrated, a flow 232 of fluid is discharged at the heat exchanger 210 and is received at an activated carbon filtration device 234. The system 200 as shown further includes a blower 238 that draws a treated flow 236 from the filtration device 234. The blower 238 can be operated to control a circulation rate within the system 200, which can vary. The blower 238 delivers a flow 240 to a heater 242. The heater 242 can raise the temperature of the fluid, and a heated flow 244 is then delivered back to the vessel 104. In some examples, the heater 242 can be configured to raise a temperature of the fluid to a range of between 5° and 250° C., or a range of between 9° and 150° C. In some examples, the heater 242 can be configured to raise a temperature of the fluid to approximately 100° C.

In use, the system 200 can be used to thermally regenerate the vessel 104. In the regeneration mode, hot, siloxane-laden fluid exiting the vessel 104 as the flow 208 can be cooled by the at least one heat exchanger 210, 214 to remove water, siloxanes and other components. The condensed liquids are collected as the flow 228 and the fluid is recirculated. In the regeneration mode, the temperature of the heater 242 can be raised slowly to allow the vessel 104 to warm gradually. During this heating, fluid molecules can be desorbed to their vapor pressure at that temperature and then condensed over the heat exchangers 210, 214. It is possible that some liquids can solidify on the second heat exchanger 214. The heat exchanger 214 can be sized accordingly to accommodate solid formation on heat exchanger surfaces without plugging or otherwise mechanically blocking its operation.

In some examples, the heat exchanger 214 can be cooled so that the exiting flow 224 can be cooled to approximately −20° C. or below. In some examples, fluid can be recirculated within the system 200 until the heated flow 244 at the outlet of vessel 104 reaches approximately 100° C. and vapor pressure in the system 200 reaches steady state. At any time, if the tank 226 is full (e.g. a high level switch is activated), the tank 226 can be emptied and its contents discharged to a landfill or a storage tank (not shown). In some examples, the system 200 can include the filtration device 234 to prevent non-condensable siloxanes from reaching hot surfaces downstream where they can decompose and can deposit $SiO_2$ on the blower 238 and/or the heater 242.

In the example illustrated, the system 200 further includes a valve 250 arranged between the filtration device 234 and the blower 238. In some examples, once the system 200 is at steady state or near-steady state conditions, a purge mode can be initiated. The valve 250 can be closed to stop flow between conduits 248, 252. Contaminated gas can be removed at exit 246, which is intermediate of the filtration device 234 and the valve 250. Clean gas can be introduced at supply 254, which is intermediate of the valve 250 and the blower 238. The blower 238 receives the clean gas via conduit 256. In other examples, clean gas can be supplied intermediate of the blower and the heater. The clean gas can be swept through the loop, including a purge of the tank 226, and the contaminated gas (having passed through the activated carbon filtration device 234) can be sent for disposal at exit 246.

During the clean gas purge, the chiller device 220 can be turned off and the heat exchanger 214 can be warmed to melt any solid material accumulated on the heat exchanger surfaces. Also, the vessel 104 can then be cooled to less than 35° C. to prepare for operation in its process mode in which the flow 102 of fluid is treated (FIG. 1).

Figure 4:
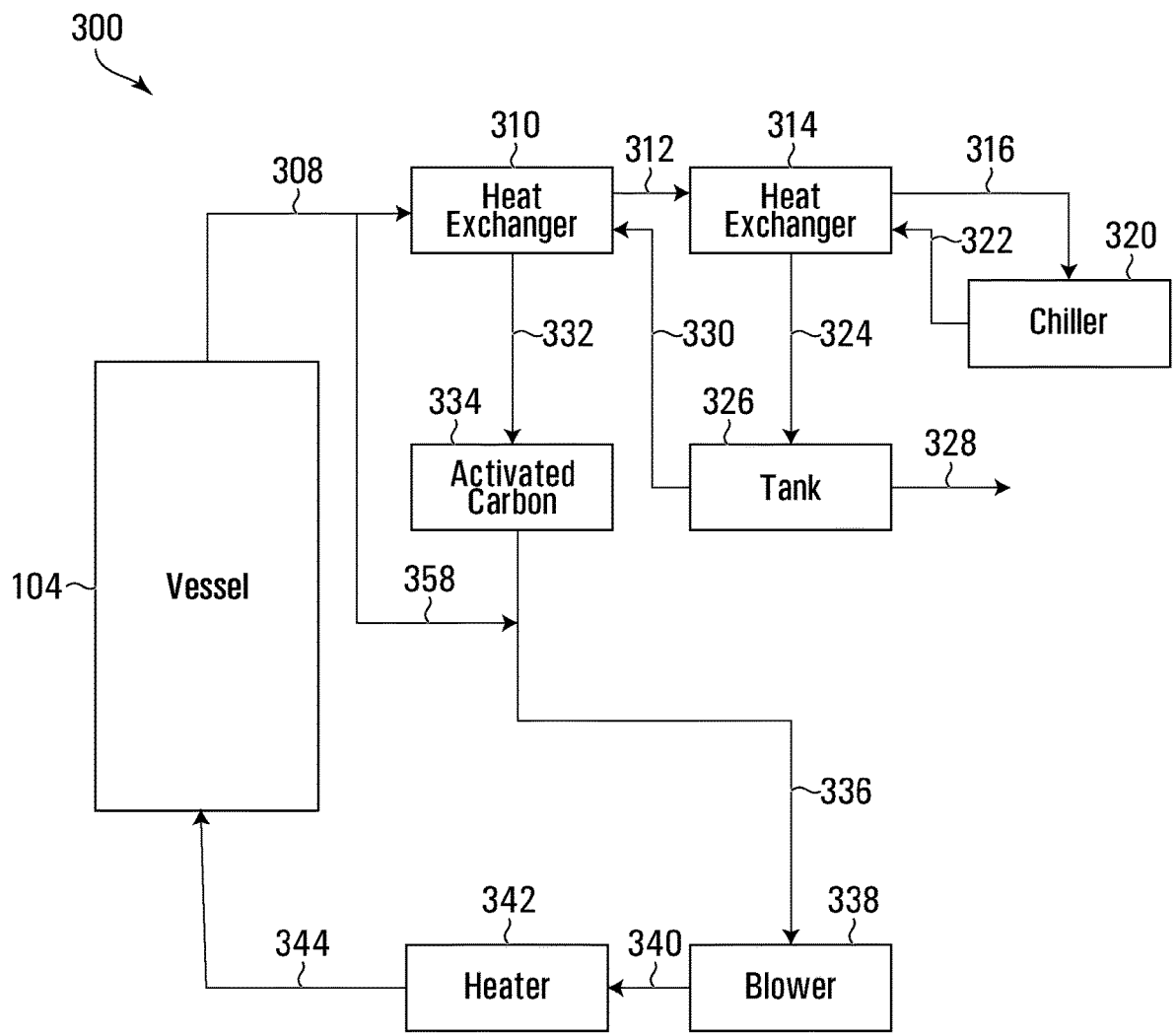
FIG. 4 is a schematic diagram of a third exemplary system.

Referring to FIG. 4, a system for regenerating a siloxane treatment vessel is indicated generally at reference numeral 300. The system 300 includes the vessel 104, and can be operated in accordance with a regeneration mode. In use, siloxanes and/or other organic compounds can be removed from the vessel 104 by gas cooling and heating, and without emitting waste gases to the environment.

In the example illustrated, an initial flow 308 of fluid is discharged at the vessel 104 and is received at a first heat exchanger 310. The flow 308 can consist of biogas including desorbed siloxanes from media within the vessel 104. A first cooled flow 312 of fluid is discharged at the heat exchanger 310 and is received at a second heat exchanger 314. A second cooled flow 324 of fluid is discharged at the heat exchanger 314. The heat exchangers 310, 314 can be connected in series and can operate to progressively reduce the temperature of the fluid.

In some examples, as illustrated, a chiller device 320 can be coupled to the heat exchanger 314, and coolant 316, 322 can be circulated therebetween. In some examples, the chiller device 320 can circulate glycol or another suitable coolant to maintain the heat exchanger 314 at a desired temperature.

In the example illustrated, a knockout tank 326 receives the flow 324 of fluid from the heat exchanger 314, and can separate a portion as condensed siloxanes, organic compounds and water 328. The remaining components can then be discharged from the tank 326 as a remainder flow 330. The flow 330 can consist of methane, low molecular weight siloxanes, volatile organic compounds and other chemical components. The flow 330 is shown directed back to the heat exchanger 310 for energy recovery.

In the example illustrated, a flow 332 of fluid is discharged at the heat exchanger 310 and is received at an activated carbon filtration device 334. The system 300 as shown further includes a blower 338 that draws a treated flow 336 from the filtration device 334. The blower 338 can be operated to control a circulation rate within the system 300, which can vary. The blower 338 delivers a flow 340 to a heater 342. The heater 342 can raise the temperature of the fluid, and a heated flow 344 is then delivered back to the vessel 104. In some examples, the heater 342 can be configured to raise a temperature of the fluid to a range of between 5° and 250° C., or a range of between 9° and 150° C. In some examples, the heater 342 can be configured to raise a temperature of the fluid to approximately 100° C.

In some examples, the heater 342 can include a heat exchanger or an electrical heater, or a combination thereof. If an electrical heater is used, the temperature of the heating transfer surfaces can be maintained at less than 200° C. to avoid siloxane decomposition.

In the example illustrated, the system 300 further includes a bypass conduit 358 that can be configured to divert a portion of the flow 308 to the blower 338 and the heater 342, to bypass the heat exchangers 310, 314 and the filtration device 334. Bypassing these components can allow for faster heat-up of the vessel 104. In some examples, the bypass conduit 358 can be arranged to divert between 0 and 95% of the flow 308. In some examples, the bypass conduit 358 can be adjusted to vary the flow rate therethrough. The bypass conduit 358 can be adjusted to improve or optimize regeneration of the vessel.

The system 300 can provide energy savings. For example, use of the system 300 can decrease energy consumption by reducing load on the heater 342 and/or the chiller device 320. The system 300 can also allow the siloxane vessel 104 to be heated quickly, due to a fast flow rate.

In use, after regeneration of the vessel 104 is complete, a clean gas purge can be initiated, which can be similar to the procedure described above in relation to the system 200.

It should be appreciated that the systems 100, 200, 300 can include additional valves, blowers, conduits and/or other hardware not shown, for controlling the flow of fluid between components.

While the above description provides examples of one or more apparatuses or methods, it will be appreciated that other apparatuses or methods may be within the scope of the accompanying claims.

We claim:

1. A method of regenerating a siloxane treatment vessel, comprising:
    receiving a flow of fluid from the siloxane treatment vessel;
    cooling the flow of fluid;
    separating a condensed portion of the flow of fluid;
    disposing the condensed portion;
    heating the remainder flow of fluid; and
    delivering the heated flow to the siloxane treatment vessel.

2. The method of claim 1, wherein the step of cooling comprises passing the flow of fluid through at least one heat exchanger.

3. The method of claim 2, comprising circulating coolant between a chiller device and the at least one heat exchanger.

4. The method of claim 1, wherein the step of cooling comprises lowering a temperature of the flow of fluid to approximately −20° C. or below.

5. The method of claim 1, wherein the step of separating comprises passing the cooled flow of fluid through a knock-out tank.

6. The method of claim 1, wherein the step of heating comprises raising a temperature of the remainder flow of fluid to a range of between 5° and 250° C., or a range of between 9° and 150° C., or approximately 100° C.

7. The method of claim 1, comprising, after the step of separating, passing the remainder flow of fluid through an activated carbon filtration device.

8. The method of claim 7, comprising, in a purge mode:
    removing contaminated gas; and
    introducing clean purge gas to the siloxane treatment vessel.

9. The method of claim 1, comprising bypassing a portion of the flow of fluid from the siloxane treatment vessel from the steps of cooling, separating and disposing.

10. The method of claim 3, wherein the step of cooling comprises lowering a temperature of the flow of fluid to approximately −20° C. or below.

11. The method of claim 3, wherein the step of separating comprises passing the cooled flow of fluid through a knock-out tank.

12. The method of claim 3, wherein the step of heating comprises raising a temperature of the remainder flow of fluid to a range of between 5° and 250° C., or a range of between 9° and 150° C., or approximately 100° C.

13. The method of claim 3, comprising, after the step of separating, passing the remainder flow of fluid through an activated carbon filtration device.

14. The method of claim 13, comprising, in a purge mode:
    removing contaminated gas; and
    introducing clean purge gas to the siloxane treatment vessel.

15. The method of claim 3, comprising bypassing a portion of the flow of fluid from the siloxane treatment vessel from the steps of cooling, separating and disposing.

* * * * *